(12) United States Patent
Ogata et al.

(10) Patent No.: US 8,985,668 B2
(45) Date of Patent: Mar. 24, 2015

(54) SEALING STRUCTURE OF FUEL INLET BOX

(71) Applicant: Toyoda Gosei Co., Ltd., Kiyosu-shi, Aichi-ken (JP)

(72) Inventors: Masahiro Ogata, Kiyosu (JP); Hitoshi Kino, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/949,935

(22) Filed: Jul. 24, 2013

(65) Prior Publication Data

US 2014/0084550 A1    Mar. 27, 2014

(30) Foreign Application Priority Data

Sep. 27, 2012    (JP) .................................. 2012-214737

(51) Int. Cl.
*B60K 15/05*    (2006.01)
*F16J 15/02*    (2006.01)

(52) U.S. Cl.
CPC . *F16J 15/02* (2013.01); *B60K 15/05* (2013.01)
USPC ....................... 296/97.22; 220/86.2

(58) Field of Classification Search
CPC ........... B60K 15/05; B60K 2015/0474; B60K 2015/053; F16J 15/02; F16J 15/025
USPC ................. 296/97.22, 193.05, 198; 280/86.2; 277/637, 644, 921
See application file for complete search history.

(56) References Cited

U.S. PATENT DOCUMENTS

| 7,311,348 | B1 * | 12/2007 | Bang | 296/97.22 |
| 8,360,501 | B2 * | 1/2013 | Zentner | 296/97.22 |
| 2009/0189410 | A1 * | 7/2009 | Gurtatowski et al. | 296/97.22 |
| 2010/0301055 | A1 * | 12/2010 | Zentner | 220/562 |
| 2012/0161462 | A1 * | 6/2012 | Zentner | 296/97.22 |

FOREIGN PATENT DOCUMENTS

| FR | 2845645 A1 * | 4/2004 |
| JP | 2005-319960 A | 11/2005 |
| JP | 2010-241286 A | 10/2010 |

* cited by examiner

*Primary Examiner* — Glenn Dayoan
*Assistant Examiner* — Jason S Daniels
(74) *Attorney, Agent, or Firm* — Posz Law Group, PLC

(57) ABSTRACT

Provided is a sealing structure of a fuel inlet box exhibiting good sealing characteristics without deforming a mounting surface of a vehicle body side panel. The fuel inlet box comprises a main body member and a sealing member. The main body member has a box portion, and a storage wall bulging from a side wall of the box portion and having space for storing an arm portion of a lid body. The mounting surface is interposed between a base portion of the storage wall and a flange portion, and faces the flange portion through a gap extending in a planar direction. A seal lip of the sealing member is fixed on the flange portion, extending toward the mounting surface and inclined toward an outer peripheral side of an opening. An outer basing point of a root portion of the seal lip is located in the flange portion.

4 Claims, 15 Drawing Sheets

RELATED ART

RELATED ART

SEALING STRUCTURE OF FUEL INLET BOX

BACKGROUND OF THE INVENTION

1. Field of the Invention

The present invention relates to a sealing structure of a fuel inlet box having a portion for storing an arm portion of a lid body.

2. Description of Related Art

A fuel inlet box is mounted around an inlet opening of a fuel filler pipe in a vehicle body panel of a vehicle. An example of the fuel inlet box is shown in PTL 1. FIG. 14 corresponds to FIG. 3 of Japanese Unexamined Patent Publication No. 2005-319960 (PTL 1). As shown in FIG. 14, a box portion 92 of a fuel inlet box 90 is fixed so as to fit onto a mounting surface 91a at a periphery of a mounting hole formed in a vehicle body panel 91. A bottom portion of the box portion 92 is connected to an inlet opening 93a at an upper end of a fuel filler pipe 93, which is connected to a fuel tank, not shown. Next to the box portion 92, the fuel inlet box 90 has a storage wall 95 having a storage space for rotatably storing an arm portion 94a provided on a lid body 94.

However, a hinge joint portion 94b of the arm portion 94a of the lid body 94 is fixed to the storage wall 95. Therefore, load is applied to the storage wall 95 by opening and closing operations of the lid body 94, and the storage wall 95 is easily deformed. In this case, a gap may be formed between a fitting portion 95a of the storage wall 95 and the mounting surface 91a, decreasing sealing characteristics and causing water entry into the vehicle body.

As a measure to improve the sealing characteristics of the fitting portion 95a, it is possible to increase volume of the fitting portion 95a of the storage wall 95 to enhance rigidity of the fitting portion 95a and then fit the enlarged fitting portion 95a onto the mounting surface 91a. In this case, however, the great volume of the fitting portion 95a may apply excessive compressive load onto the mounting surface 91a and cause problems such as deformation of the mounting surface 91a and a decrease in sealing characteristics caused by the deformation.

Moreover, since the fuel inlet box 90 is surrounded by a great number of vehicle component parts, sometimes the mounting surface 91a formed on the vehicle body panel 91 cannot have a sufficiently great depth D. In this case, a gap between the mounting surface 91a and the storage wall 95 is small, so the fitting portion 95a of the storage wall 95 for fitting onto the mounting surface 91a is difficult to have a sufficiently large size to exhibit sealing characteristics.

Under these circumstances, as shown in FIG. 15, Japanese Unexamined Patent Publication No. 2010-241286 (PTL 2) proposed to prevent deformation of the mounting surface 91a and improve sealing characteristics by fixing a sealing member 97 to the fuel inlet box 90, forming a seal lip 97a at an outer peripheral portion of the sealing member 97 and bringing a lip surface of the sealing lip 97a in close contact with the mounting surface 91a.

However, since the seal lip 97a is formed at the outer peripheral portion of the sealing member 97, which is formed of an elastic material, the contact of the seal lip 97a with the mounting surface 91a is weak and sealing characteristics are not good enough.

3. Prior Art Literature

[Patent Literature]

[PTL 1] Japanese Unexamined Patent Publication No. 2005-319960

[PTL 2] Japanese Unexamined Patent Publication No. 2010-241286

BRIEF SUMMARY OF THE INVENTION

The present invention has been made in view of the above-mentioned circumstances. It is an object of the present invention to provide a sealing structure of a fuel inlet box exhibiting good sealing characteristics without deforming a mounting surface of a vehicle body side panel.

(1) A sealing structure of a fuel inlet box of the present invention is a sealing structure a fuel inlet box for sealing the fuel inlet box against a mounting surface at a periphery of a mounting hole of a vehicle body side panel; the fuel inlet box having an opening to be opened and closed by a lid body and mounted on the mounting surface, and; the fuel inlet box comprising a main body member, and a sealing member formed of an elastic material and sealing a gap between the main body member and the mounting surface; the main body member having a box portion having a side wall surrounding an inner space, the opening communicating with the inner space and a connection port of a fuel filler pipe, and a storage wall bulging from the side wall of the box portion toward an outside of the box portion and having a storage space communicating with the inner space of the box portion and rotatably storing an arm portion provided on the lid body; and the storage wall having a storage opening periphery constituting part of an opening periphery surrounding the opening, at least the storage opening periphery of the opening periphery having a flange portion facing the mounting surface; the storage wall having a base portion disposed on a vehicle body inner side of the vehicle body side panel, the base portion being connected through a peripheral portion of the mounting hole of the vehicle body side panel to the flange portion disposed on a vehicle body outer side of the vehicle body side panel; the mounting surface of the vehicle body side panel interposed between the base portion and the flange portion, and the flange portion facing the mounting surface through a gap extending in a planar direction of the mounting surface; the sealing member having a seal lip provided on the flange portion of at least the storage opening periphery of the opening periphery and extending toward the mounting surface and inclined toward an outer peripheral side of the opening periphery; and an outer basing point of a root portion of the seal lip being located in a facing surface of the flange portion facing the mounting surface.

In the above construction, the sealing member has a seal lip extending toward the mounting surface of the vehicle body side panel. The mounting surface of the vehicle body side panel and the flange portion of the main body member face each other, and a gap extending in a planar direction of the mounting surface is disposed between the mounting surface and the flange portion. Therefore, there is space for the seal lip to fall down between the mounting surface and the flange portion. Consequently, even if the gap between the mounting surface and the flange portion is small, the seal lip can be brought in close contact with the mounting surface by small compressive load.

Moreover, the outer basing point of the root portion of the seal lip is a basing point located on an inclined side of the seal lip, and a portion on which compressive stress is concentrated when the seal lip falls down. The outer basing point of the root portion on which stress is concentrated in the seal lip is located in part of the flange portion facing the mounting surface. The flange portion is formed of a material constituting the fuel inlet box and has higher rigidity than the elastic material constituting the sealing member. Therefore, the outer basing point of the root portion of the seal lip is supported by the facing surface of the flange portion having high rigidity. The seal lip can be stably brought in close contact with the mounting surface.

Moreover, since the seal lip is formed of an elastic material, the seal lip can be brought in close contact with the mounting surface by small compressive load. The mounting surface of the vehicle body side panel does not receive excessive compressive load from the seal lip, so the mounting surface is free from a risk of deformation or that of a decrease in sealing characteristics.

As mentioned above, the seal lip can securely seal the gap between the flange portion and the mounting surface, and water can be effectively prevented from entering into an inside of a vehicle body through the gap between the flange portion and the mounting surface.

(2) It is preferable that the facing surface of the flange portion facing the mounting surface has a stepped portion bent in a direction away from the mounting surface; the outer basing point of the root portion of the seal lip being located in a vertical wall portion of the stepped portion extending in a direction away from the mounting surface; an inner basing point of the root portion of the seal lip portion being located in an inner peripheral portion of the facing surface of the flange portion closer to the opening than the stepped portion.

In this case, the outer basing point of the root portion of the seal lip is located at a more distant position from the mounting surface than the inner basing point. Therefore, when shape of the seal lip and the gap between the inner peripheral portion of the facing surface of the flange portion and the mounting surface are the same, the amount of compression of the seal lip compressed by the mounting surface is smaller when the outer basing point is located in the vertical wall portion than when the outer basing point is located in the inner peripheral portion. Therefore, pressing force of the seal lip onto the mounting surface is lessened, so deformation of the mounting surface can be prevented. Moreover, deformation of the flange portion on which the seal lip is fixed can be prevented. Furthermore, no excessive compressive force is exerted on the seal lip. Upon receiving a high-pressure water jet as in car washing, the seal lip can be deformed in a direction to improve sealing characteristics and exhibit good sealing characteristics.

(3) It is preferable that the seal lip has a tapered shape with a decreasing width from the root portion toward a fore end, and 10 degrees≤θ≤30 degrees is satisfied where θ is a taper angle formed by straight line passing through the outer basing point and the fore end of the seal lip and straight line passing through the inner basing point and the fore end of the seal lip.

When the taper angle θ is less than 10 degrees, the seal lip is too thin and may ripple in a perimeter direction. When a ripple phenomenon occurs, sealing characteristics of the seal lip may decrease.

(4) It is preferable that 50 degrees≤α≤70 degrees is satisfied, where α is an inclination angle of an extending direction of the seal lip with respect of the facing surface of the flange portion facing the mounting surface.

When the inclination angle α is less than 50 degrees, adhesive strength of the seal lip to the mounting surface may decrease. On the other hand, when the inclination angle α is greater than 70 degrees, it is difficult for the seal lip to fall down onto the mounting surface and sealing characteristics may decrease. The term the "facing surface" used herein means a facing surface of the flange portion when the facing surface is flat, and means a facing surface of part of the flange portion extending almost in parallel with the mounting surface when the facing surface is bent.

(5) It is preferable to provide gap keeping means for keeping the gap between the flange portion and the mounting surface at a predetermined distance. Since the gap keeping means keeps the gap between the flange portion and the mounting surface at a predetermined distance, the seal lip can stably and reliably seal the gap between the flange portion and the mounting surface.

As mentioned before, one of the advantages of the sealing structure of the fuel inlet box of the present invention is as follows: Since the outer basing point of the root portion of the seal lip is located in the flange portion, the sealing structure can exhibit good sealing characteristics without deforming the mounting surface of the vehicle body side panel.

BRIEF DESCRIPTION OF THE DRAWINGS

The exact nature of the present invention, as well as other objects and advantages thereof, will be readily apparent from consideration of the following specification relating to the accompanying sheets of drawings, in which.

DETAILED DESCRIPTION OF THE PREFERRED EMBODIMENTS

Figure 1:
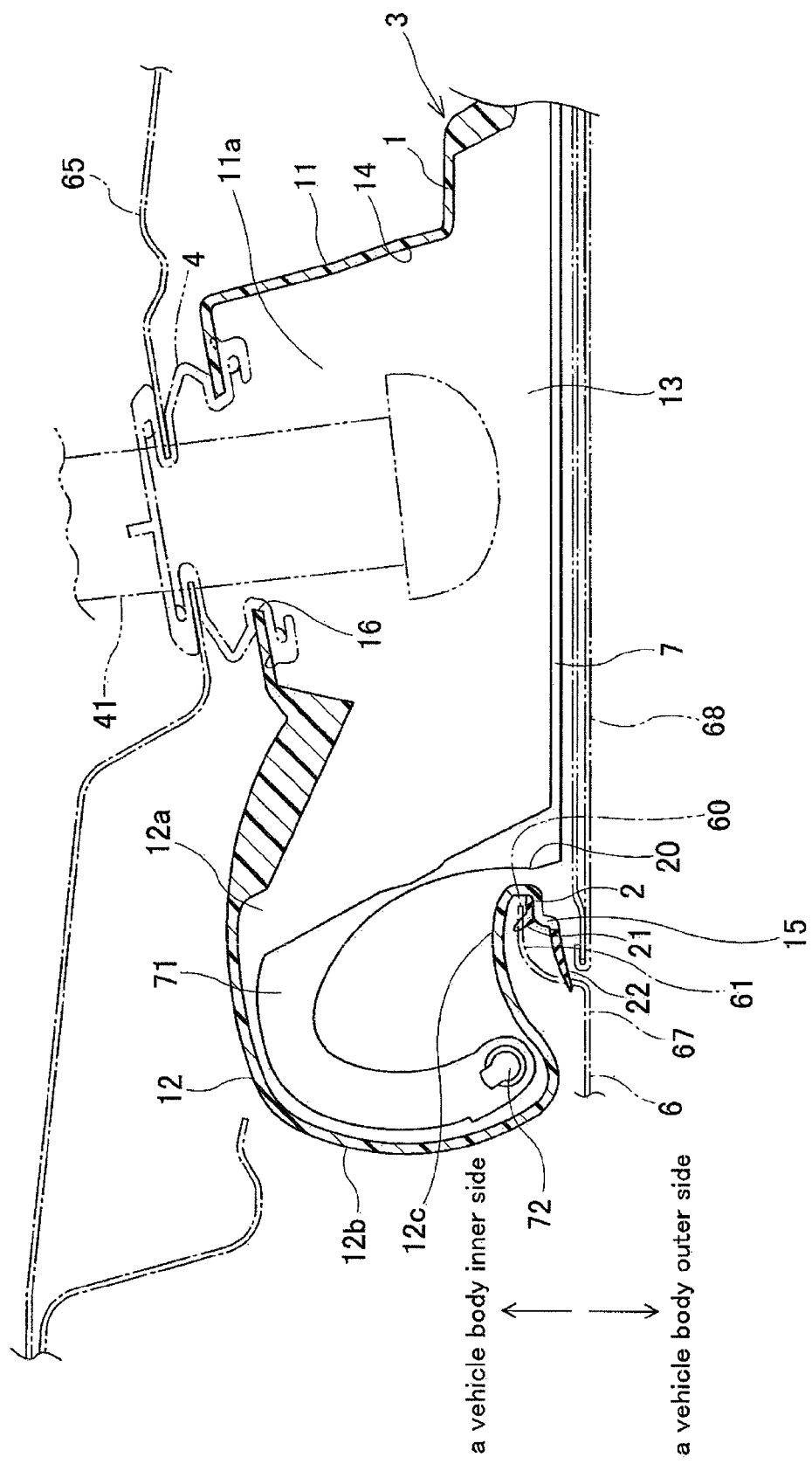
FIG. 1 shows a fuel inlet box of a preferred embodiment of the present invention and is a cross-sectional view taken along the plane indicated by the arrows A-A in FIG. 2.
Figure 2:
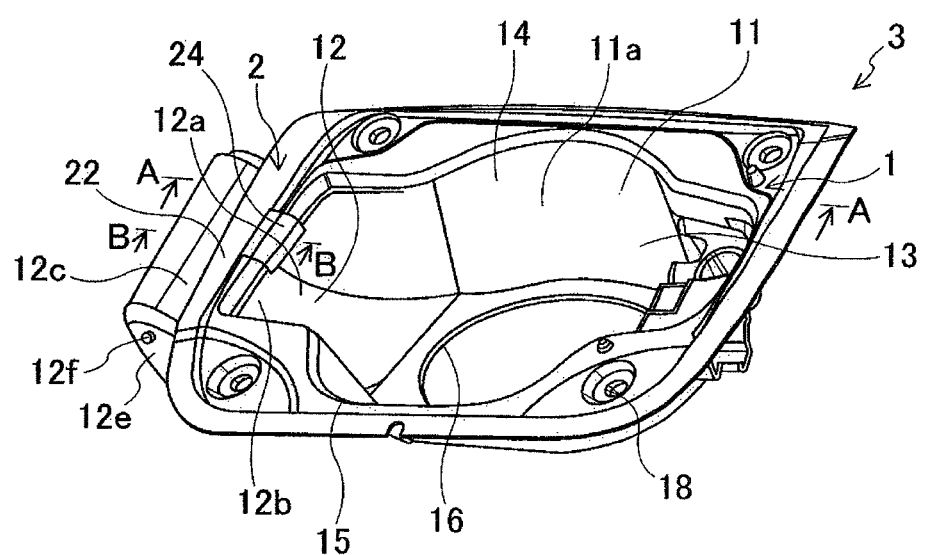
FIG. 2 is a perspective view of the fuel inlet box of the preferred embodiment.

A sealing structure of a fuel inlet box 3 according to a preferred embodiment of the present invention will be described with reference to the drawings. FIG. 1 is a cross-sectional view of the fuel inlet box 3 taken along the plane indicated by the arrows A-A in FIG. 2. FIG. 2 is a perspective view of the fuel inlet box 3.

As shown in FIG. 1, the fuel inlet box 3 is mounted on a mounting surface 61 at a periphery of a mounting hole 60 formed in a vehicle body side panel 6. The vehicle body side panel 6 is a side member outer panel. The mounting surface 61 is a peripheral portion of the mounting hole 60 and surrounds the mounting hole 60 in a rectangular frame shape. A ring-shaped sealing member 2 for sealing the fuel inlet box 3 against the mounting surface 61 is fixed on the fuel inlet box 3.

The mounting surface 61 is located at a depressed position from a general portion 67 of the vehicle body side panel 6 toward a vehicle body inner side. Therefore, the fuel inlet box 3 mounted on the mounting surface 61 is located on a vehicle body inner side of a general portion 67 of the vehicle body side panel 6. When a lid body 7 for opening and closing an opening 13 of the fuel inlet box 3 is in a closed position, a design plate 68 for covering the lid body 7 can be placed almost in the same plane with the general portion 67 of the vehicle body side panel 6.

Now, referring to FIG. 2, the fuel inlet box 3 comprises a main body member 1, and the sealing member 2 for sealing a gap between the main body member 1 and the mounting surface 61. The main body member 1 is formed of a resin material such as polypropylene. The sealing member 2 is formed of an elastic material such as TPO (olefin-base thermoplastic elastomer).

The main body member 1 has a box portion 11 having the opening 13, a storage wall 12 bulging from a side wall 14 of the box portion 11, and a flange portion 15 formed at a periphery of the opening 13.

The box portion 11 has the shape of a hollow cylinder with a bottom and has the side wall 14 extending from a vehicle body outer side toward a vehicle body inner side and surrounding an inner space 11a. The box portion 11 has the inner space 11a surrounded by the side wall 14, the opening 13 formed on a vehicle body outer side, and a pipe connection port 16 formed on a vehicle body inner side. A sealing bellows 4 formed of a rubber material and having a cylindrical bellows shape fits on a periphery of the pipe connection port 16, and a holding surface at a fore end of the sealing bellows 4 holds a fore end portion of a fuel filler pipe 41. The sealing bellows 4 is held by a wheel housing outer panel, which is another vehicle body side panel 65 disposed on a vehicle body inner side of the vehicle body side panel 6.

A fuel dispenser nozzle is inserted into the inner space 11a of the box portion 11 through the opening 13 in order to supply fuel to a fuel tank of a vehicle, and fuel is supplied from the fuel dispenser nozzle to the fuel filler pipe 41 fixed at the pipe connection port 16.

The storage wall 12 is integrally connected to the side wall 14 of the box portion 11 and bulges from the side wall 14 of the box portion 11 toward an outside of the box portion 11, as mentioned above. A storage space 12a of the storage wall 12 communicates with the inner space 11a of the box portion 11 and turnably stores an arm portion 71 of the lid body 7 for opening and closing the opening 13. A rotation axis portion 72 of the arm portion 71 is located on a most bulged portion of the storage wall 12.

Figure 3:
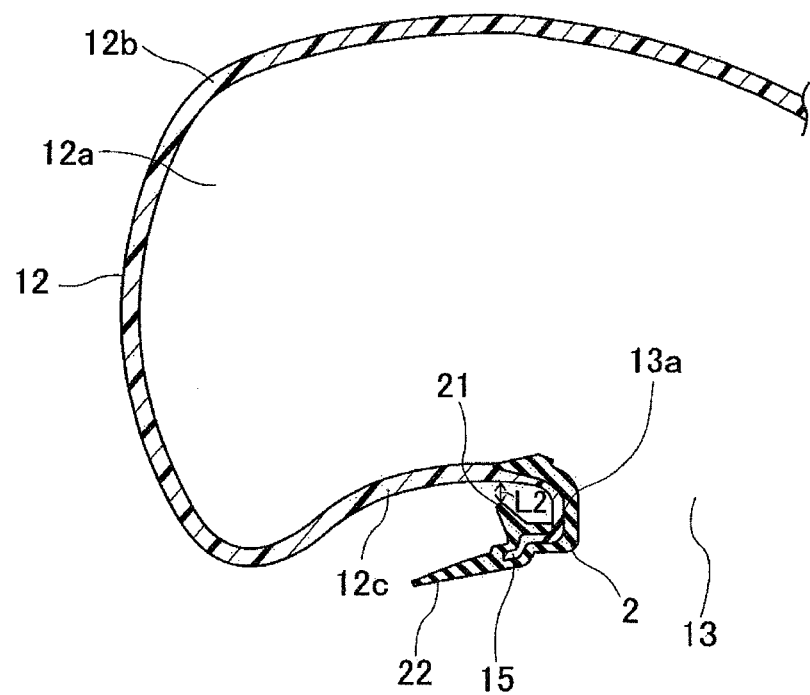
FIG. 3 shows a storage wall of the fuel inlet box of the preferred embodiment and is a cross-sectional view taken along the plane indicated by the arrows B-B in FIG. 2.

FIG. 3 shows the storage wall 12 and is a cross-sectional view taken along the plane indicated by the arrows B-B in FIG. 2 and. As shown in FIG. 3, a vehicle body inner portion of the storage wall 12 comprises a storage portion 12b having the storage space 12a for rotatably storing the arm portion 71. The storage portion 12b has an arc shape corresponding to an outer peripheral shape of the arm portion 71 of the lid body 7 in a closed position. An end portion of the storage portion 12b on a vehicle body outer side is connected to a base portion 12c, which faces the mounting surface 61 of the vehicle body side panel 6. Sides of the storage portion 12b and the base portion 12c are respectively closed by side walls 12e. A bearing portion 12f for rotatably supporting the rotation axis portion 72 of the lid body 7 is formed on an outer peripheral side of each of the side walls 12e. The base portion 12c of the storage wall 12 is connected to a storage opening periphery 13a, which constitutes part of the periphery of the opening 13. More specifically, the base portion 12c of the storage wall 12 goes around to an inside of the opening 13, passes through the opening 13 and reaches an outside of the vehicle body side panel 6, thereby connected to the storage opening periphery 13a.

Figure 4:
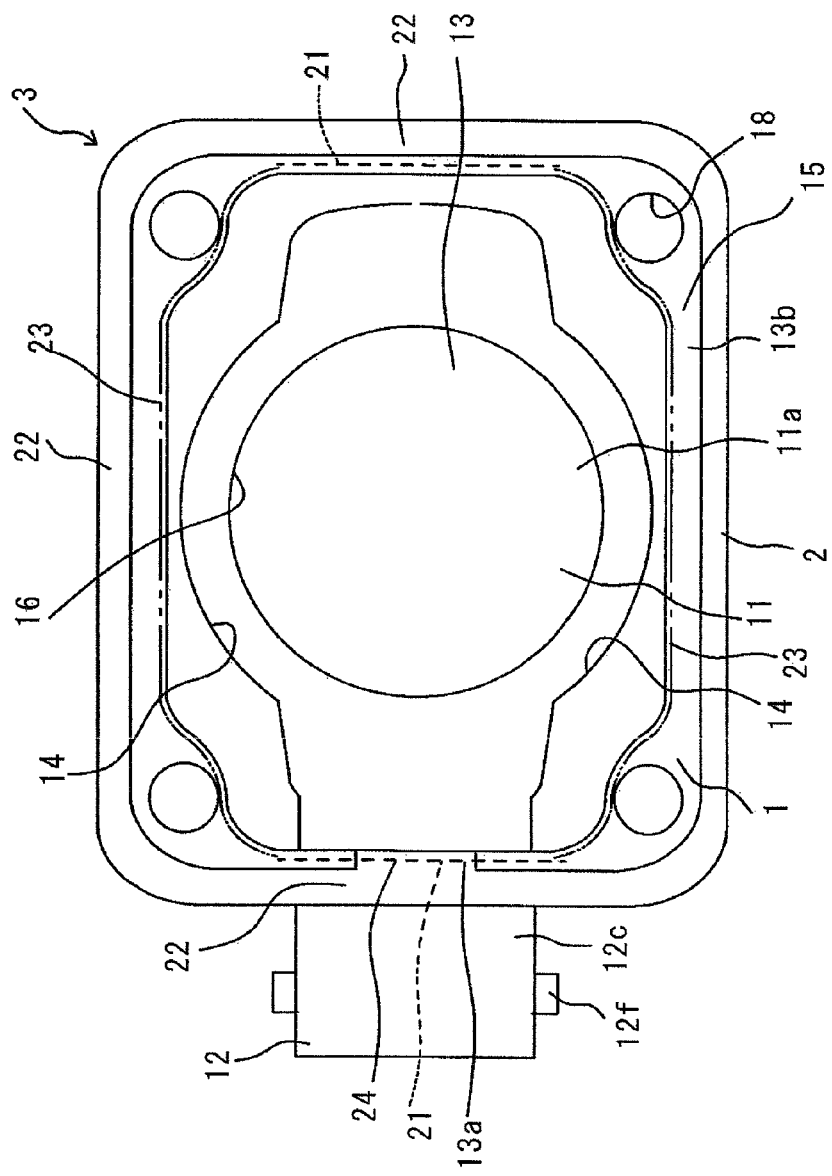
FIG. 4 is a plan view of the fuel inlet box of the preferred embodiment.

FIG. 4 is a plan view of the fuel inlet box 3. As shown in FIG. 4, the flange portion 15 is formed at the periphery of the opening 13 of the box portion 11 and extends on an outer peripheral side of the inner space 11a. The flange portion 15 has a roughly rectangular frame shape and the entire perimeter of the flange portion 15 is covered with the sealing member 2. It should be noted that a reference numeral 18 in FIG. 4 designates a screw hole for fixing the fuel inlet box 3 on the mounting surface 61.

Now, a relation between part of the flange portion 15 in the vicinity of the storage opening periphery 13a of the storage wall 12 and the sealing member 2 covering this part of the flange portion 15 will be described in detail.

Figure 5:
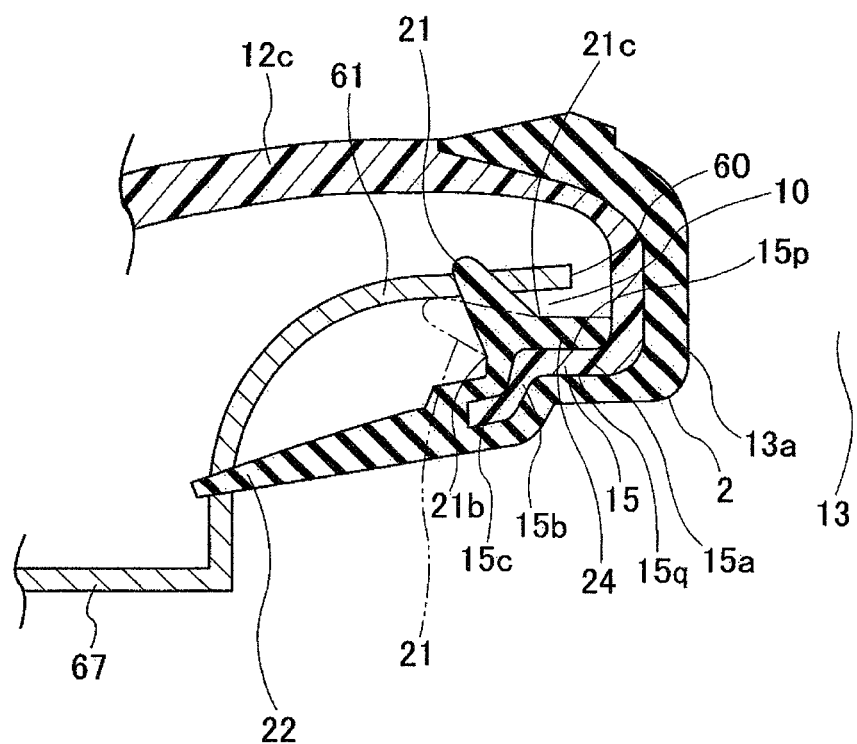
FIG. 5 is a cross-sectional view of a flange portion and part of a sealing member in the vicinity of a storage opening periphery of the fuel inlet box of the preferred embodiment.
Figure 6:
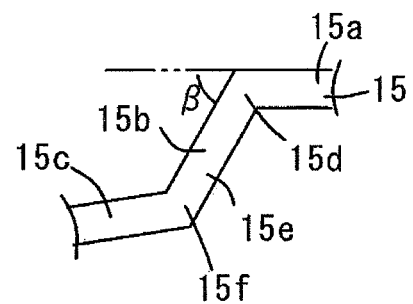
FIG. 6 is a cross-sectional view of part of the flange portion in the vicinity of the storage opening periphery of the fuel inlet box of the preferred embodiment.
Figure 7:
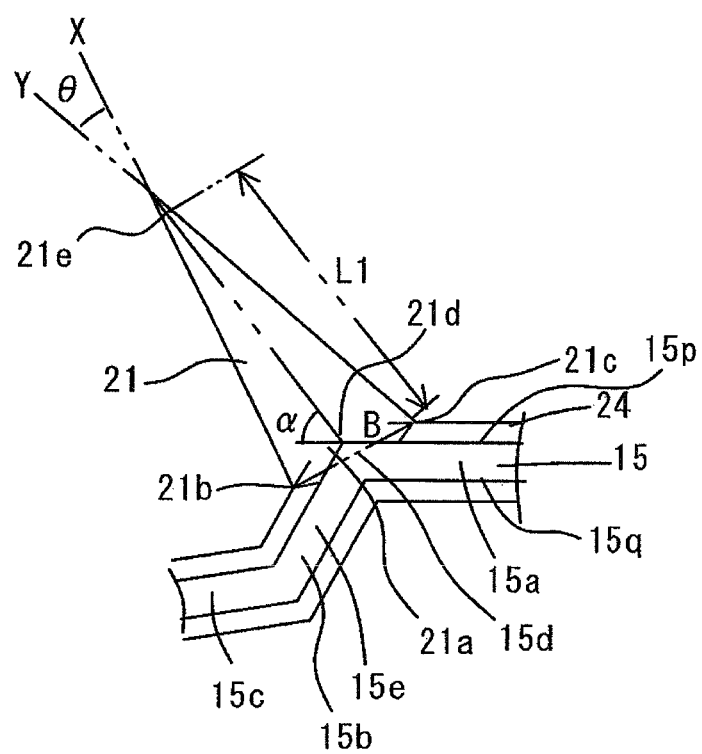
FIG. 7 is a cross-sectional view of part of the flange portion and part of the sealing member in the vicinity of the storage opening periphery of the fuel inlet box of the preferred embodiment for showing dimensions.

FIG. 5 is a cross-sectional view of the mounting surface 61 and the storage opening periphery 13a. FIG. 6 is a cross-sectional view of part of the flange portion 15 in the vicinity of the storage opening periphery 13a. FIG. 7 is a cross-sectional view of part of the flange portion 15 and part of the sealing member 2 in the vicinity of the storage opening periphery 13a for showing dimensions. As shown in FIG. 5, the mounting surface 61 of the vehicle body side panel 6 is disposed between the flange portion 15 and the base portion 12c of the storage wall 12. The flange portion 15 has a facing surface 15p facing the mounting surface 61. The facing surface 15p of the flange portion 15 in the vicinity of the storage opening periphery 13a comprises an inner peripheral portion 15a extending approximately in parallel to the mounting surface 61, a stepped portion 15b formed on an outer peripheral side of the inner peripheral portion 15a and bent in a direction away from the mounting surface 61, and an end portion 15c formed on an outer peripheral side of the stepped portion 15b and extending approximately in parallel to the mounting surface 61.

As shown in FIGS. 5 and 6, the stepped portion 15b comprises an inner bent portion 15d bent toward a vehicle body outer side from the inner peripheral portion 15a, a vertical wall portion 15e connected to the inner bent portion 15d and extending in a direction away from the mounting surface 61, and an outer bent portion 15f connected to the vertical wall portion 15e and bent toward an outer peripheral side of the opening 13. The vertical wall portion 15e is inclined at an inclination angle β of 10 degrees to 45 degrees with respect to the planar direction of the inner peripheral portion 15a of the flange portion 15. In this preferred embodiment, β is set to 30 degrees.

As shown in FIGS. 5 and 7, the sealing member 2 is integrally provided on the flange portion 15. The sealing member 2 comprises a cover portion 24 covering the flange portion 15, a seal lip 21 extending from the cover portion 24 toward the mounting surface 61, and a design lip 22 extending from an end portion of the cover portion 24 in an outer peripheral direction.

At a center portion of the storage opening periphery 13a, as shown in FIGS. 2, 5 and 7, the seal lip 21 and the design lip 22 are connected to each other by the cover portion 24. Moreover, the cover portion 24 covers from the facing surface 15p to part of the flange portion 15 facing the opening 13. The center portion of the storage opening periphery 13a is a portion which may contact the arm portion 71 when the lid body 7 opens. In order to cushion an impact of the contact of the arm portion 71, the cover portion 24 also covers a front surface 15q, which lies on an opposite side of the facing surface 15p.

On both sides of the center portion of the storage opening periphery 13a, as shown in FIGS. 2 and 1, the sealing member 2 only covers the facing surface 15p of the flange portion 15, and in addition, the seal lip 21 is separate from the design lip 22.

As shown in FIG. 7, the seal lip 21 has a tapered shape with a gradually decreasing width from a root portion 21a toward a fore end 21e. An outer basing point 21b of the root portion 21a of the seal lip 21 is located in the vertical wall portion 15e of the flange portion 15. An inner basing point 21c of the root portion 21a is located in the inner peripheral portion 15a of the flange portion 15. An intermediate portion 21d of the root portion 21a between the outer basing point 21b and the inner basing point 21c is located in the inner bent portion 15d of the flange portion 15.

It is preferable that 10 degrees≤θ≤30 degrees is satisfied and it is more preferable that 15 degrees≤θ≤25 degrees is satisfied, where θ is a taper angle formed by straight line X passing through the outer basing point 21b of the root portion 21a and the fore end 21e of the seal lip 21 and straight line Y passing through the inner basing point 21c of the root portion 21a and the fore end 21e of the seal lip 21. In this preferred embodiment, θ is set to 23.1 degrees.

It is preferable that 50 degrees≤α≤70 degrees is satisfied, where α is an inclination angle of the extending direction of the seal lip 21 with respect to the facing surface 15p of the flange portion 15. In this preferred embodiment, α is set to 60 degrees. The root portion 21a of the seal lip 21 has a width B of 2.2 mm. The sealing lip 21 has a length L1 of 3.8 mm in its extending direction. A distance L2 between the fore end 21e of the seal lip 21 and the base portion 12c of the storage wall 12 is 2.8 mm (see FIG. 3).

As shown in FIG. 5, the design lip 22 is formed on the sealing member 2 on an outer peripheral side of the seal lip 21 of the sealing member 2. The design lip 22 extends from the end portion 15c of the flange portion 15 in an outer peripheral direction. The design lip 22 has a length of 12 mm. A fore end of the design lip 22 closely contacts the mounting surface 61.

Figure 8:
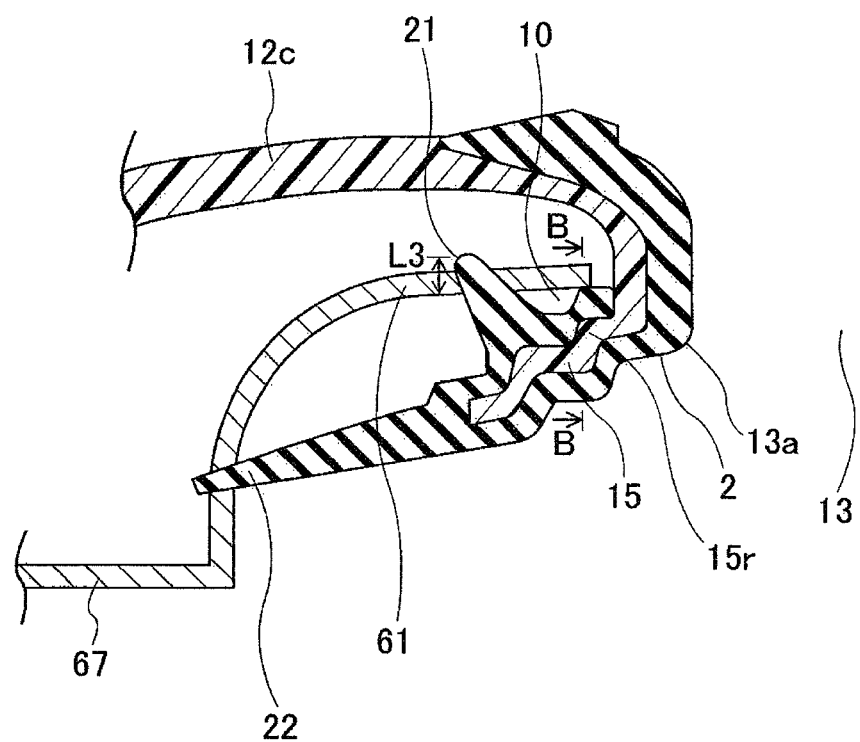
FIG. 8 is a cross-sectional view of part of the flange portion and part of the sealing member in the vicinity of the storage opening periphery of the fuel inlet box of the preferred embodiment for showing gap keeping means.
Figure 9:
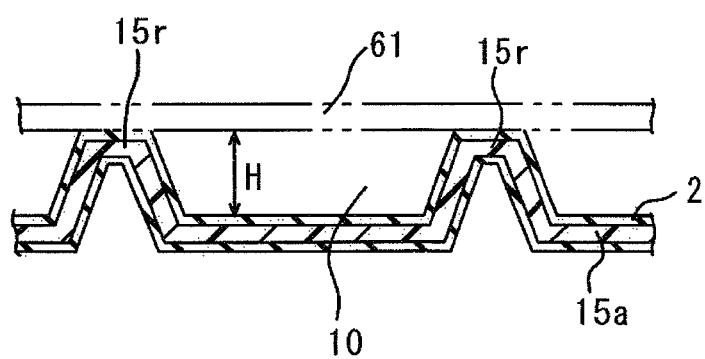
FIG. 9 is a cross-sectional view taken along the plane indicated by the arrows B-B in FIG. 8.

FIG. 8 is a cross-sectional view of the opening peripheral portion 13a of the storage wall 12 for showing gap keeping means. FIG. 9 is a cross-sectional view taken along the plane indicated by the arrows B-B in FIG. 8. As shown in FIGS. 8 and 9, a plurality of protrusions 15r are formed on the flange portion 15 at intervals in a perimeter direction. The protrusions 15r are gap keeping means for keeping the gap 10 between the flange portion 15 and the mounting surface 61 at a predetermined distance. The protrusions 15r protrude from the inner peripheral portion 15a of the flange portion 15 to a height H of 1.0 mm. The protrusions 15r are formed at intervals at positions close to the seal lip 21. Owing to the protrusions 15r, the seal lip 21 is set to overlap the mounting surface 61 by an overlapping length L3 of 0.7 to 1.5 mm. Accordingly, as indicated by a dotted line in FIG. 5, the seal lip 21 falls down outward along the mounting surface 61 and seals the gap between the flange portion 15 and the mounting surface 61 with a predetermined adhesive strength while being in plane contact with the mounting surface 61.

By the way, seal lips 21 and 23 are continuously formed in a ring shape along the entire perimeter of the flange portion 15 of the fuel inlet box 3 at positions indicated by the dotted line and long dashed double dotted line in FIG. 4. Moreover, the design lip 22 is continuously formed in a ring shape along the entire perimeter of the flange portion 15.

At the storage opening periphery 13a of the opening 13, the seal lip 21 is formed between the vertical wall portion 15e of the facing surface 15p and the inner peripheral portion 15a of the flange portion 15, as described above and shown in FIGS. 5 to 7. Additionally, on part of the general portion 13b except the storage opening periphery 13a facing the storage opening periphery 13a across the opening 13, another seal lip 21 is formed between the vertical wall portion 15e of the facing surface 15p and the inner peripheral portion 15a of the flange portion 15, as shown in FIGS. 5 to 7.

Figure 10:
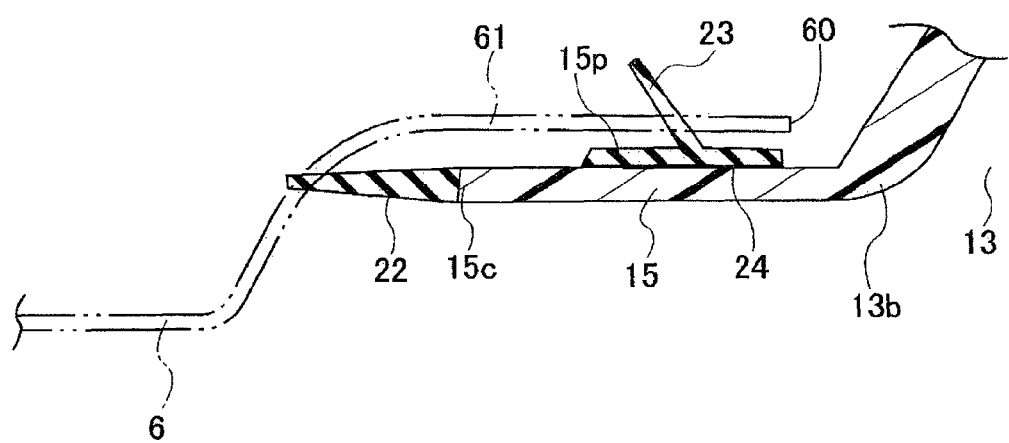
FIG. 10 is a cross-sectional view of a seal lip formed on a flat portion of a facing surface of the flange portion and its neighborhood of the fuel inlet box of the preferred embodiment.
Figure 11:
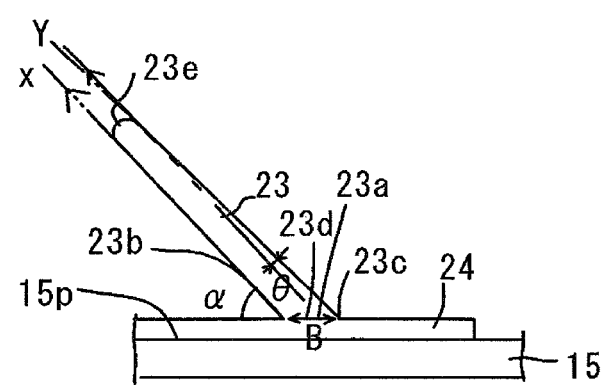
FIG. 11 is a cross-sectional diagram of the seal lip in FIG. 10 for showing dimensions.

On the other hand, at positions indicated by the long dashed double dotted line, that is to say, on other portions of the general portion 13b, i.e., at portions adjoining the storage opening periphery 13a via corners, seal lips 23 are located on a flat facing surface 15p of the flange portion 15, as shown in FIGS. 10 and 11.

FIG. 10 is a cross-sectional view of one of the seal lisps 23 formed on the flat facing surface 15p of the flange portion 15. FIG. 11 is a cross-sectional diagram of the seal lip 23 shown in FIG. 10 for showing dimensions. As shown in FIGS. 10 and 11, the seal lip 23 is located on the flat surface of the facing surface 15p of the flange portion 15 and the extending direction of the seal lip 23 has an inclination angle α of 47 degrees with respect to the flat facing surface 15p. A root portion 23a of the seal lip 23 between an outer basing point 23b and an inner basing point 23c has a width B of 0.9 mm. θ=4 degrees, where θ is a taper angle formed by straight line X passing through an outer basing point 23b of the root portion 23a and a fore end portion 23e of the seal lip 23 and straight line Y passing through an inner basing point 23c of the root portion 23a and the fore end portion 23e of the seal lip 23.

The root portion 23a of the seal lip 23 is formed on the cover portion 24 having a predetermined width and covering the facing surface 15p of the flange portion 15. The cover portion 24 is located at a distance from the design lip 22 formed on the end portion 15c of the flange portion 15. A gap between the seal lip 23 and the design lip 22 has a different width depending on portions, as shown in FIG. 4. A general portion 13b of the periphery of the opening 13 is not provided with the storage wall 12 having the base portion 12c, and has a vehicle body inner side of the mounting surface 61 left open.

Figure 12:
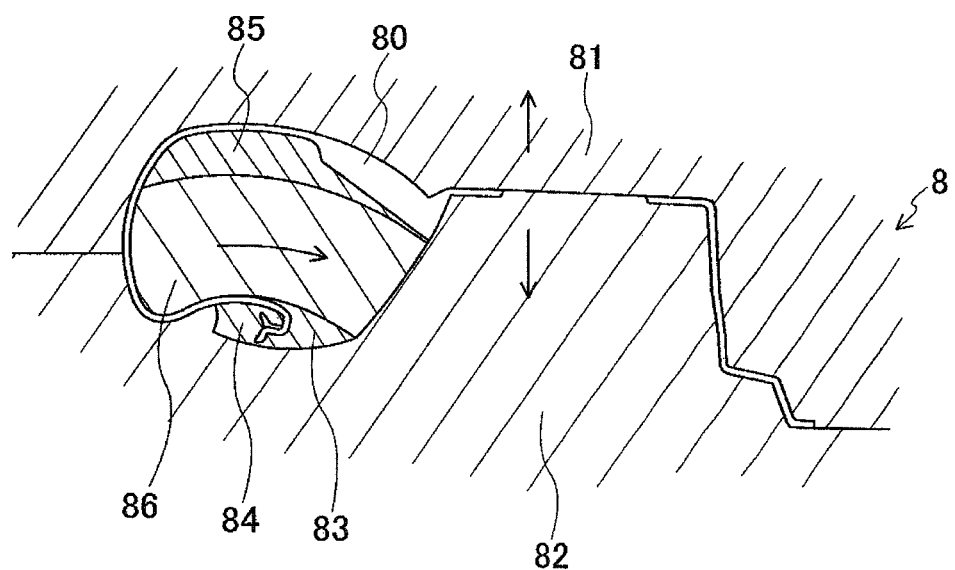
FIG. 12 is a cross-sectional view of a mold of the preferred embodiment.

FIG. 12 is a cross-sectional view of a mold 8 for forming the main body member 1 of the fuel inlet box 3. As shown in FIG. 12, the mold 8 comprises an upper mold 81, a lower mold 82, cores 83, 84, 85 and a rotational slide core 86. The upper mold 81 and the lower mold 82 respectively have cavities corresponding to a vehicle body inner side and a vehicle body outer side of the main body member 1 of the fuel inlet box 3, and the upper mold 81 further has a cavity surface for forming the inner space 11a in the box portion 11. The rotational slide core 86 has a core surface approximately corresponding to the storage space 12a surrounded by the storage wall 12, and the cores 83 to 85 are placed to form an undercut portion of the main body member 1. The fuel inlet box 3 is formed by injection molding a resin material comprising polypropylene into a cavity 80 surrounded by these molds. Then the upper mold 81 and the lower mold 82 are opened, the rotational slide core 86 is rotated and removed, and the cores 83 to 85 are also slid and removed.

Subsequently, the seal member 2 is insert molded by using an insert molding die and injecting an elastic material at the periphery of the opening 13 of the box portion 11. However, the sealing member 2 can be formed simultaneously with the main body member 1 by two color injection molding.

In this preferred embodiment, the sealing member 2 is fixed on the flange portion 15 at the periphery of the opening 13. At the storage opening periphery 13a of the entire periphery of the opening 13 connected to the storage wall 12 and part of the general portion 13b facing the storage opening periphery 13a across the opening 13, the outer basing point 21b of the root portion 21a of each of the seal lips 21 is located in the stepped portion 15b of the flange portion 15. On the other hand, at other parts of the general portion 13b, each of the seal lips 23 is located on the flat surface of the flange portion 15. The flange portion 15 formed along the entire perimeter of the opening 13 faces the mounting surface 61. Therefore, there is space for the seal lips 21, 23 to fall down between the mounting surface 61 and the flange portion 15. Therefore, even if the mounting surface 61 has a small depth, the seal lips 21, 23 can be brought in close contact with the mounting surface 61 by small compressive load.

Moreover, the outer basing points 21b, 23b of the root portions 21a, 23a of the seal lips 21, 23 are basing points of the seal lips 21, 23 in inclined directions, and portions on which compressive stress is concentrated when the seal lips 21 23 fall down. The outer basing points 21b, 23b of the root portions 21b, 23b on which stress is concentrated in the seal lips 21, 23 are located in the facing surface 15p of the flange portion 15 having a relatively high rigidity. Therefore, the seal lips 21, 23 can closely contact the mounting surface 61 with stability.

Of the periphery of the opening 13, especially the storage opening periphery 13a is a portion which is close to the bearing portion 12f of the storage wall 12 and easily deformable by receiving stress from rotation of the arm portion 71. At this storage opening periphery 13a, the seal lip 21 is located on the stepped portion 15b of the flange portion 15, as shown in FIG. 7. Therefore, the seal lip 21 is supported by the flange portion 15 having a relatively high rigidity and is brought in close contact with the mounting surface 61. Even if the flange portion 15 moves relatively to the mounting surface 61, for example, when the arm portion 71 rotates, the seal lip 21 can closely contact the mounting surface 61 and keep to exhibit high sealing characteristics.

Moreover, as shown in FIG. 12, the storage wall 12 is a portion formed by using the rotational slide core 86. Width of an inlet port of the storage wall 12 needs to be as large as that of the most bulged portion of the storage wall 12 in order to rotate and remove the rotational slide core 86. Therefore, as shown in FIG. 1, the gap between the base portion 12c of the storage wall 12 and the flange portion 15 needs to be small and this imposes a restriction on designing the seal lip 21.

In this preferred embodiment, however, the seal lip 21 is located on the flange portion 15 extending roughly in parallel to the mounting surface 61 of the vehicle body side panel 6. The mounting surface 61 and the flange portion 15 face each other and the gap 10 extends in the planar direction of the mounting surface 61 between the mounting surface 61 and the flange portion 15. Therefore, sufficiently large space for the seal lip 21 to fall down is secured between the mounting surface 61 and the flange portion 15. Therefore, even if the gap 10 between the mounting surface 61 and the flange portion 15 is small, the seal lip 21 can be brought in close contact with the mounting surface 61 by small compressive load and exhibit good sealing characteristics.

The outer basing point 21b of the root portion 21a of the seal lip 21 is located in the vertical wall portion 15e of the stepped portion 15b of the flange portion 15, and the inner basing point 21c is located in the inner peripheral portion 15a. The outer basing point 21b of the seal lip 21 is located at a more distant position from the mounting surface 61 than the inner basing point 21c. Therefore, in a case where the seal lip 21 has the same shape and the gap 10 between the inner peripheral portion 15a and the mounting surface 61 is the same, the amount of the seal lip 21 compressed by the mounting surface 61 is smaller when the outer basing point 21b is located in the vertical wall portion 15e than when the outer basin point 21b is located in the inner peripheral portion 15a. Therefore, pressing force of the seal lip 21 onto the mounting surface 61 decreases, so deformation of the mounting surface 61 can be prevented and as a result deformation of the flange portion 15 on which the seal lip 21 is fixed can also be prevented. Moreover, excessive compressive force is not applied on the seal lip 21 and, for example, upon receiving a high-pressure water jet as in car washing, the seal lip 21 can be deformed in such a direction to improve sealing characteristics and exhibit good sealing characteristics.

Hence, even if the flange portion 15 of the storage opening periphery 13a is moved relatively to the mounting surface 61 by rotation of the arm portion 71, the seal lip 21 can be brought in close planar contact with the mounting surface 61 and securely seal the gap between the seal lip 21 and the mounting surface 61.

Moreover, since the seal lips 21, 23 are formed of an elastic material, the sealing lips 21, 23 are brought in close contact with the mounting surface 61 of the vehicle body side panel 6 by small compressive load. Hence, the mounting surface 61 does not receive excessive compressive load from the seal lips 21, 23, and accordingly may not be deformed. The sealing characteristics of the seal lips, 21, 23 may not be decreased by deformation, either.

The seal lips 21, 23 are continuously formed along the entire perimeter of the opening 13. Therefore, sealing characteristics of the entire perimeter of the opening 13 can be enhanced and water entry into the vehicle body inner side can be securely prevented. Moreover, a double sealing structure comprising the seal lips 21, 23 and the design lip 22 is employed along the entire perimeter of the opening 13. Therefore, even better sealing characteristics can be exhibited.

As mentioned above, the gap between the flange portion 15 and the mounting surface 61 can be securely sealed by the seal lips 21, 23. Water entry through the gap between the flange portion 15 and the mounting surface 61 can be effectively prevented.

Example 1

Figure 13:
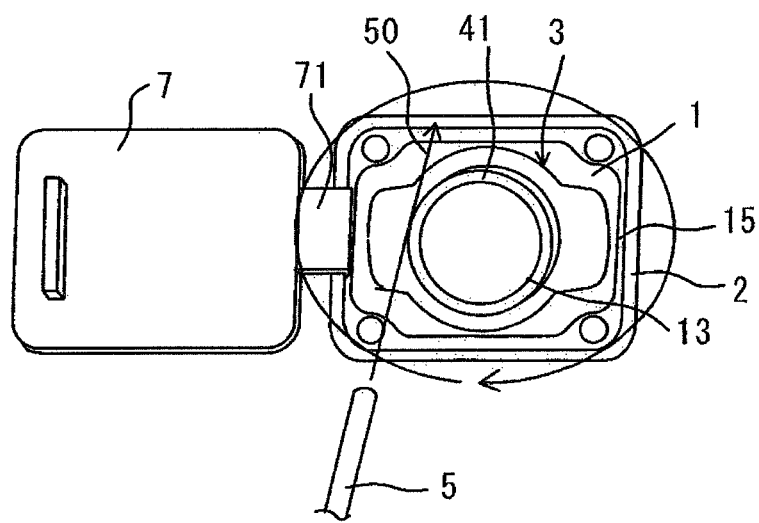
FIG. 13 is an explanatory diagram for showing a method of a water entry test of a fuel inlet box in Example 1.
Figure 14:
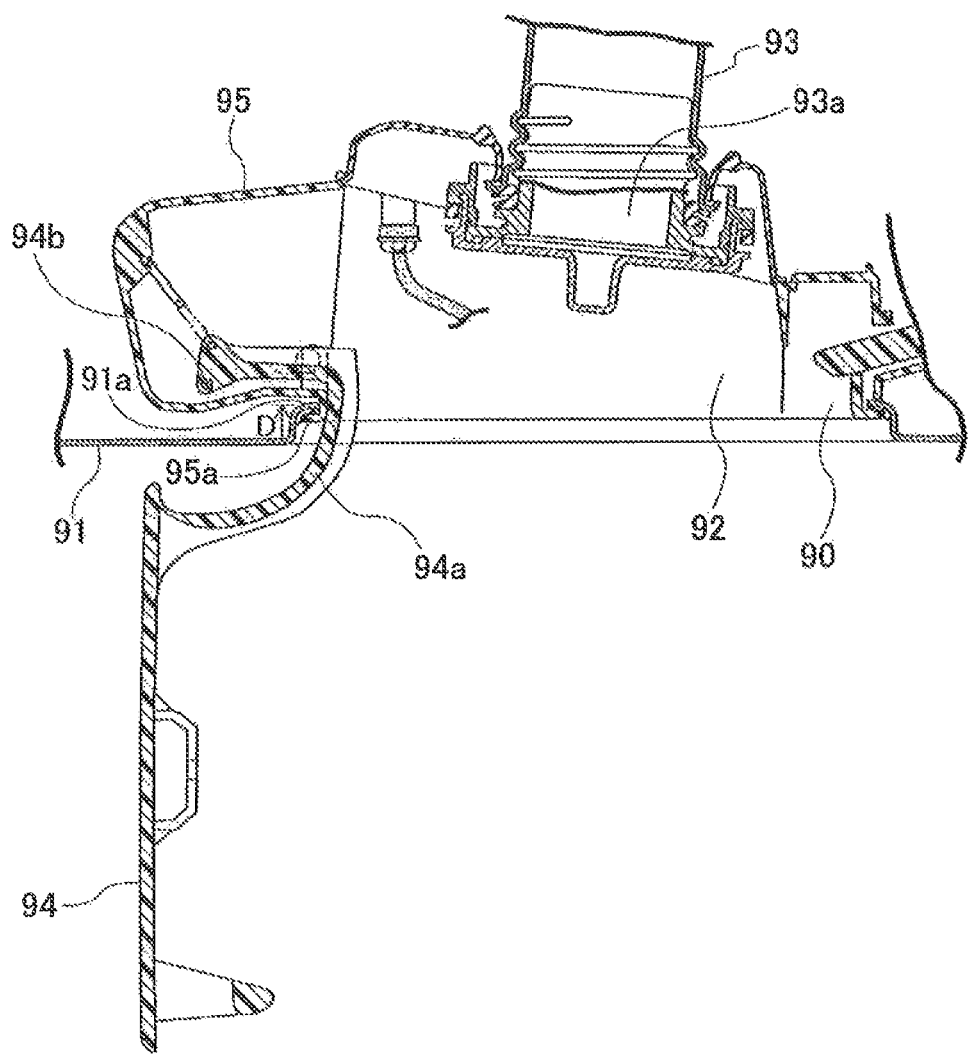
FIG. 14 is a cross-sectional view of a fuel inlet box of a conventional example.
Figure 15:
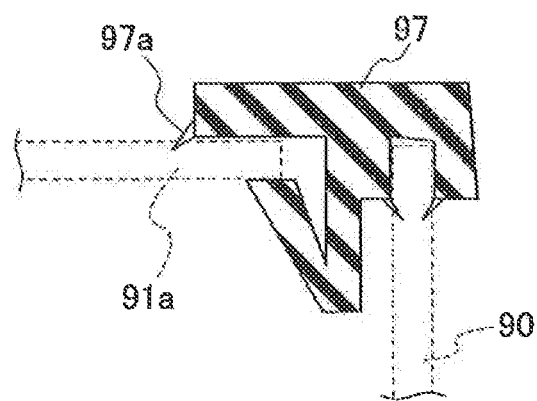
FIG. 15 is a cross-sectional view of a sealing member of a fuel inlet box of another conventional example.

In this example, a water entry test of the fuel inlet box of the preferred embodiment was carried out. FIG. 13 is an explanatory diagram for showing a method of the water entry test. As shown in FIG. 13, the water entry test was performed by discharging water 50 from an end of a hose 5 having an inner diameter of 19 mm with the hose 5 lifted by about 1 m in a vertical direction. A discharge height of water 50 was about 20 to 22 cm. With the lid body 7 opened and the opening 13 of the fuel inlet box 3 exposed, the end of the hose 5 was moved close to the flange portion 15 at the periphery of the opening 13. A distance between the end of the hose 5 and the flange portion 15 was set at 10 cm. Water 50 was discharged onto the periphery of the opening 13 in a route indicated by the arrow in FIG. 13 by having the end of the hose 5 draw an ellipse on a vehicle body outer side of the opening 13. Moving speed of the hose 5 was set at 25 m/s.

Either when the end of the hose 5 was rotated around the opening 13 once or five times, water did not enter into a vehicle inner side of the vehicle body side panel 6. When water 50 was continuously discharged to the periphery of the opening 13 for one or two minutes, water did not enter into the vehicle body inner side, either.

Example 2

In this example, a water pressure test of the fuel inlet box used in Example 1 was carried out. Water was injected from a washing gun of a high-pressure washing machine (produced by Sumoto Seibiki Seisakusho Co., Ltd.). Water from the washing gun had a diffusion angle of about 5 to 15 degrees and water discharge pressure was 7.9 MPa. A fore end of the washing gun was located at a distance of 50 cm from the flange portion of the fuel inlet box. The water pressure test was conducted by injecting water at the flange portion of the fuel inlet box for 10 seconds. The water pressure test was performed both when the lid body 7 was open and when closed.

As a result, either when the lid body 7 was open or when closed, water didn't leak into a vehicle body inner side.

(Others)

Although the stepped portion 15b is formed on the flange portion 15 at the periphery of the opening 13 in the preferred embodiment, a flat surface can be formed instead of the stepped portion 15b and the outer basing point 21b of the root portion 21a of the seal lip 21 can be located in the flat surface.

The flange portion 15 is formed not only at the storage opening periphery 13a of the storage wall 12 but also along the entire perimeter of the opening 13 and the seal lips 21, 23 are disposed on the flange portion 15 in the preferred embodiment. However, it is possible to form the flange portion 15 only at the storage opening periphery 13a and dispose the seal lip 21 on the flange portion 15 formed at the storage opening periphery 13a. It is also possible to form the flange portion 15 along the entire perimeter of the opening 13 but form the seal lip 21 only on the flange portion 15 at the storage opening periphery 13a and form no seal lip on the general portion 13b except the storage opening periphery 13a.

It is also possible to form the flange portion 15 having the stepped portion 15b along the entire perimeter of the opening 13 and locate the outer basing point 21b of the root portion 21a of the seal lip 21 in the vertical portion 15e of the stepped portion 15b along the entire perimeter of the opening 13 and locate the inner basing point 21c in the inner peripheral portion 15a.

Although the stepped portion 15b of the flange portion 15 has the vertical wall portion 15e inclined in the planar direction of the inner peripheral portion 15a in the preferred embodiment, the vertical wall portion can extend in a perpendicular direction to the planar direction of the inner peripheral portion 15a.

Obviously, many modifications and variations of the present invention are possible in the light of the above teachings. It is therefore to be understood that within the scope of the appended claims, the invention may be practiced otherwise than as specifically described.

What is claimed is:

1. A sealing structure of a fuel inlet box for sealing the fuel inlet box against a mounting surface at a periphery of a mounting hole of a vehicle body side panel, the fuel inlet box having an opening to be opened and closed by a lid body and mounted on the mounting surface, and the fuel inlet box comprising a main body member, and a sealing member formed of an elastic material and sealing a gap between the main body member and the mounting surface, the main body member having:

a box portion having a side wall surrounding an inner space, the opening communicating with the inner space and a connection port of a fuel filler pipe, and a storage wall bulging from the side wall of the box portion toward an outside of the box portion and having a storage space communicating with the inner space of the box portion and rotatably storing an arm portion provided on the lid body, and the storage wall having a storage opening periphery constituting part of an opening periphery surrounding the opening, at least the storage opening periphery of the opening periphery having a flange portion facing the mounting surface, the storage wall having a base portion disposed on a vehicle body inner side of the vehicle body side panel, the base portion being connected through the mounting hole of the vehicle body side panel to the flange portion disposed on a vehicle body outer side of the vehicle body side panel, the mounting surface of the vehicle body side panel interposed between the base portion and the flange portion, and the flange portion facing the mounting surface through a gap extending in a planar direction of the mounting surface, the sealing member having a seal lip provided on the flange portion of at least the storage opening periphery of the opening periphery and extending toward the mounting surface and inclined toward an outer peripheral side of the opening periphery, an outer basing point of a root portion of the seal lip being located at a facing surface of the flange portion facing the mounting surface, wherein the facing surface of the flange portion facing the mounting surface has a stepped portion bent in a direction away from the mounting surface, the outer basing point of the root portion of the seal lip being located in a vertical wall portion of the stepped portion extending in a direction away from the mounting surface, and an inner basing point of the root portion of the seal lip portion being located in an inner peripheral portion of the facing surface of the flange portion closer to the opening than the stepped portion.

2. The sealing structure of the fuel inlet box according to claim 1, wherein the seal lip has a tapered shape with a decreasing width from the root portion toward a fore end, and 10 degrees≤θ≤30 degrees is satisfied where θ is a taper angle formed by straight line passing through the outer basing point and the fore end of the seal lip and straight line passing through the inner basing point and the fore end of the seal lip.

3. The sealing structure of the fuel inlet box according to claim 1, wherein 50 degrees≤α≤70 degrees is satisfied, where θ is an inclination angle of an extending direction of the seal lip with respect of the facing surface of the flange portion facing the mounting surface.

4. The sealing structure of the fuel inlet box according to claim 1, further comprising gap keeping means for keeping the gap between the flange portion and the mounting surface at a predetermined distance.

* * * * *